United States Patent
Oren et al.

(10) Patent No.: US 7,792,302 B2
(45) Date of Patent: Sep. 7, 2010

(54) SECURELY COUPLING AN FPGA TO A SECURITY IC

(75) Inventors: Joseph Eugene Oren, White Stone, VA (US); Greg Sampson, Midlothian, VA (US); Daxon Alexander, Ronkonkoma, NY (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 889 days.

(21) Appl. No.: 11/670,378

(22) Filed: Feb. 1, 2007

(65) Prior Publication Data

US 2007/0204170 A1 Aug. 30, 2007

Related U.S. Application Data

(60) Provisional application No. 60/763,912, filed on Feb. 1, 2006.

(51) Int. Cl.
*H04L 9/00* (2006.01)
(52) U.S. Cl. ............... 380/277; 380/283; 380/284; 380/286; 716/16; 716/17; 713/193

(58) Field of Classification Search .............. 380/277, 380/283, 284, 286; 713/193; 716/16, 17
See application file for complete search history.

(56) References Cited

U.S. PATENT DOCUMENTS

| 7,162,644 B1 * | 1/2007 | Trimberger ............... 713/189 |
| 7,197,647 B1 * | 3/2007 | Van Essen et al. ........... 713/189 |
| 2006/0087883 A1 * | 4/2006 | Ozguz et al. ............ 365/185.04 |

* cited by examiner

*Primary Examiner*—Kieu Oanh Bui
*Assistant Examiner*—Thomas Lauzon

(57) ABSTRACT

Disclosed is a mechanism for securely coupling a security IC and an FPGA. This mechanism creates a shared secret key; creates a password key; generates an encrypted shared secret key by encrypting the "shared secret key" with the password key; incorporates the "encrypted shared secret key" into an FPGA net list; programs the FPGA using the "FPGA net list"; transmits the "password key" from the security IC to the FPGA; allowing the FPGA to: obtain the "shared secret key" by decrypting the "encrypted shared secret key"; and store the "shared secret key" in at least one volatile memory location.

18 Claims, 7 Drawing Sheets

SECURELY COUPLING AN FPGA TO A SECURITY IC

CROSS REFERENCE TO RELATED APPLICATIONS

The present application claims the benefit of provisional patent application Ser. No. 60/763,912 to Oren et al., filed on Feb. 1, 2006, entitled "Securely Coupling an FPGA to a Security IC," which is hereby incorporate by reference.

BRIEF DESCRIPTION OF THE SEVERAL VIEWS OF THE DRAWINGS

The accompanying drawings, which are incorporated in and form a part of the specification, illustrate an embodiment of the claimed invention and, together with the description, serve to explain the principles of the invention.

DETAILED DESCRIPTION OF THE INVENTION

Figure 1:
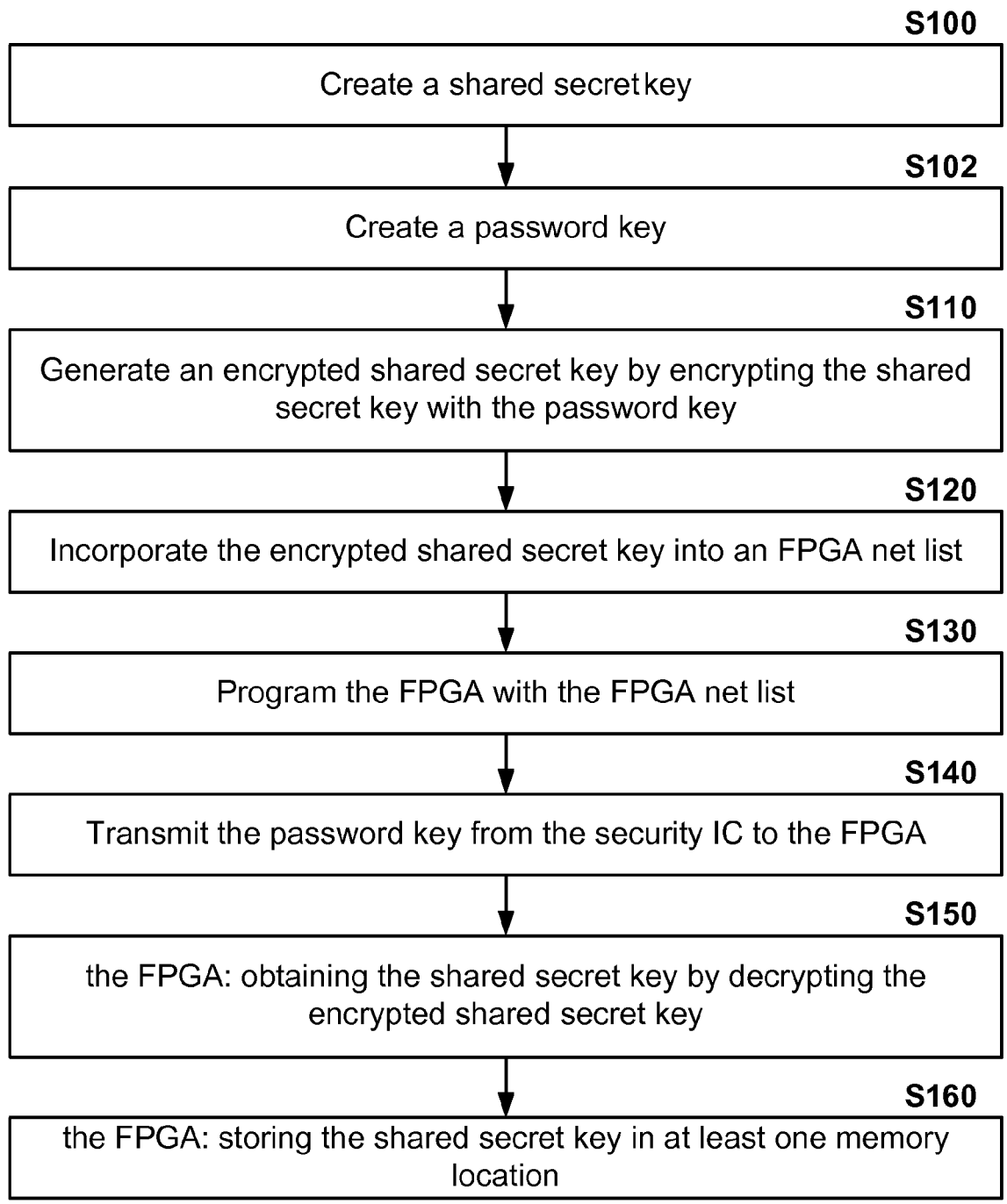
FIG. 1 is a flow diagram of a method for coupling a security IC with an FPGA as per an aspect of an embodiment of the claimed invention.

The claimed invention relates to the field of Field-Programmable Gate Arrays (FPGAs) and integrated circuits (ICs). In particular, the claim invention teaches securely coupling an FPGA to a security module, such as security integrated circuits (security ICs).

I. Introduction

A number of security ICs that address the requirements of Federal Information Processing Standards Publication 140 (FIPS 140) are commercially available. FIPS 140 is a federal standard for security modules entitled "Security Requirements for Cryptographic Modules," copies of which may be obtained from the National Institute of Standards and Technology (NIST) and which are hereby incorporated by reference. The current version being used is FIPS 140-2. This security standard provides an increasing, qualitative level of security, namely Level 1, Level 2, Level 3 and Level 4.

A security IC is an integrated circuit whose functions include cryptographic algorithms and physical security features. Some of these features are described in FIPS 140. Examples of manufacturers of security ICs include Safenet Inc. of Belcamp, MD and Maxim Integrated Products, Inc. of Sunnyvale, Calif.

ICs are small electronic devices or chips made of semiconductor material. Generally, ICs can be incorporated and used in a variety of devices, such as microprocessors, audio and/or video equipment, etc. Yet, ICs are also known to be incapable of supporting the throughput required for bulk media decryption and similar real-time applications.

Bulk media decryption is defined as decrypting large amounts of content at real-time rates. Nonlimiting examples of similar real-time applications include the presentation of encrypted digital representations of motion pictures and broadcast content. To handle such requirements, one or more FPGAs or equivalent hardware solution(s) can be coupled to a security IC. An FPGA is well known in the art as a semiconductor device that contains programmable logic components or programmable interconnections. Equivalent hardware solutions may include discrete logic combinations or combinations of other FPGA'S.

However, coupling an FPGA and a security IC may create several security issues. For instance, one security issue concerns FPGA authentication. Another concerns establishing a secure (i.e., encrypted) communications session.

Overall, a typical security module addressing requirements for bulk encryption or decryption may consist of a security IC (such as a commercial security IC) and an FPGA, along with other supporting components, such as an external RAM, etc. The security IC would handle the key management and other highly secure function. To perform these functions, the security IC can be provided stand-by battery power to monitor the physical security perimeter of the module when the overall module is in the unpowered state. Meanwhile, the FPGA would handle high speed encryption or decryption, and possibly, other operations on the data. To perform these functions, the FPGA can operate either in a powered state or unpowered state.

To provision the FPGA with cryptographic keys (also referred to herein as keys) and to perform other operations essential to the intended operation of the device, it may be necessary for the security IC to authenticate the FPGA. It may also be necessary for the security IC to establish a secure (i.e., encrypted) communications session. Authentication refers to the identification of the FPGA as an intended and real recipient of keys. A cryptographic key refers to a mathematical value that is used in an algorithm to generate cipher text from plain text and/or encoded text (e.g., encrypted data), or vice versa (e.g., decrypted data).

Both authentication and secure session establishment require that the FPGA store one or more secret keys. The secret key (also referred to herein as shared secret key) should be known only to the security IC and the FPGA. A common alternative for authentication and session establishment is using one or more asymmetric cryptographic algorithms, such as RSA. However, the use of asymmetric cryptographic algorithms is typically not available on the FPGA because of the high level of complexity and consequent gate consumption. Furthermore, many FPGAs lack internal non-volatile storage for keys and other Critical Security Parameters (CSPs). As defined in FIPS 140-2, CSPs are protected data (e.g., secret and private cryptographic keys; authentication data such as passwords, PINS, etc.). If one or more CSPs are disclosed or modified, the security of the cryptographic module may be compromised.

Another security issue that may arise involves the problem of erasing non-volatile memory. FIPS 140 requires that all plain text keys stored within the module be zeroized (erased) upon command, regardless of the state of the module. Higher levels of security in FIPS 140, namely security levels 3 and 4, require active intrusion monitoring and zeroization upon intrusion detection. While such capabilities are typically available in security ICs (specifically to address FIPS 140 requirements), FPGAs generally lack the capability of any function under less than full power. Thus, FIPS 140 effectively disallows storage of any plain text keys in an FPGA's non-volatile memory.

FPGAs typically lack non-volatile data storage or any means to erase non-volatile storage in the unpowered state. If, as frequently the case, constant power cannot be assured, the straightforward solution of storing a secret key value, either in internal non-volatile FPGA storage (if available), or in external storage, is not permitted by FIPS 140.

Consequently, what is needed is a way to bind a secret key (e.g., secret key value) to an FPGA. The binding should be conformed to FIPS 140 requirements.

II. Shared Secret Key Incorporation

The security problem of FPGA's authentication and establishing a secure communications session may be resolved by incorporating one or more shared secret keys into the FPGA net list (FPGA firmware). An FPGA net list is a list of how gates in the FPGA are interconnected. The value of the shared secret key should be unique to the pairing of the discrete FPGA and the security IC. As an embodiment, the shared secret key may be established once at manufacturing time. This key is used for the negotiation of session keys to protect communications between the security IC and the FPGA. For instance, in the process of establishing session keys, the security IC can establish that the shared secret key is known to the FPGA, and thus authenticate the FPGA.

Referring to FIG. 1, as an aspect of the claimed invention, an FPGA can be securely coupled to a security IC by creating a shared secret key at S100, creating a password key at S102, generating an encrypted shared secret key by encrypting the shared secret key with the password key at S110, incorporating the encrypted shared secret key into an FPGA net list at S120, programming the FPGA using the FPGA net list at S130, transmitting the password key from the security IC to the FPGA at S140, and the FPGA (1) obtaining the shared secret key by decrypting the encrypted shared secret at S150 and (2) storing the shared secret key in at least one volatile memory location at S160.

As another aspect of the claimed invention, the shared secret key is a plain text shared secret. In other words, the text is not encoded.

An initialization code may be used to facilitate or aide the process of creating a secret shared key and/or a password key to the transmission of the password key from the security IC to the FPGA. This code may be located on the security IC.

At times, the FPGA may transition from an unpowered state to a powered state. When this powering transition takes place, the step of transmitting the password key from the security IC to the FPGA S140 may also take place. Both transitioning may occur simultaneously or separately.

Figure 2:
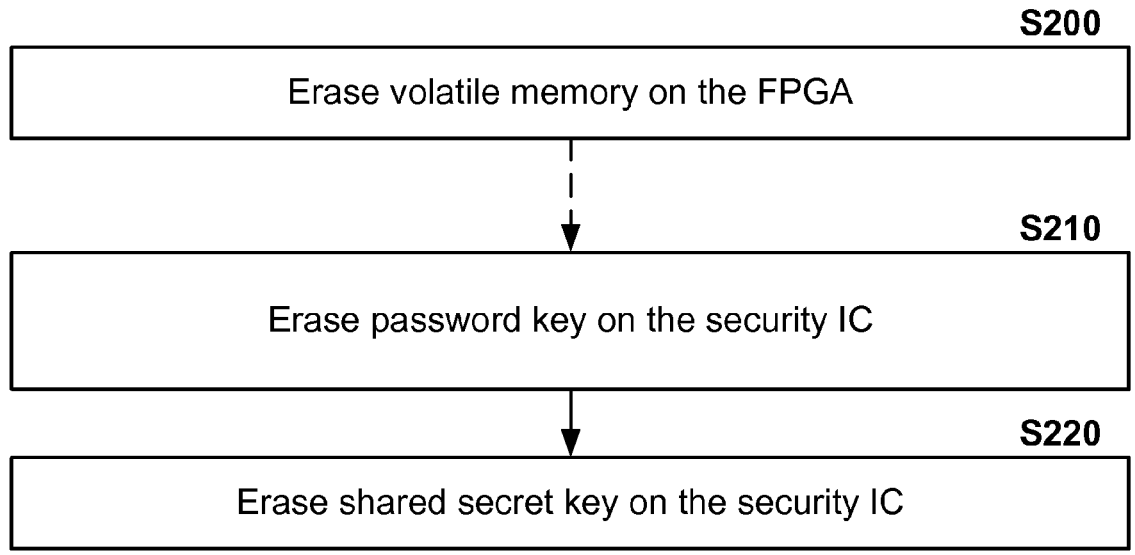
FIG. 2 is a flow diagram of a method for zeroing an FPGA and a security IC as per an aspect of an embodiment of the claimed invention.

As shown in FIG. 2, the claimed invention also allows for the erasure of the shared secret key at S220, as well as the password key at S210, that are stored on the security IC. In addition, the claimed invention optionally allows for the erasure of at least one volatile memory on the FPGA at S200. Thus, at the times when the FPGA transitions from a powered state to an unpowered state, volatile memory erasure may take place. The power down transitioning and erasure may occur simultaneously or separately. Alternatively, FPGA power down transition may occur in response to a zeroization command.

As yet another aspect of the claimed invention, the shared secret key value must be secured. If the FPGA's net list is stored externally, it might become vulnerable to analysis of the net list code. While the net list code is typically proprietary and a closely kept secret by the part manufacturer, reverse compilation is theoretically possible. In essence, FPGAs with the capability of loading an encrypted net list are helpful in reducing this threat.

If the FPGA's net list containing the shared secret key is stored internally in the FPGA, it may be difficult to erase non-volatile memory. FIPS 140 requires that all plain text keys be overwritten (zeroized) on user command, under all circumstances. However, many commercially available FPGAs lack the security features necessary to erase non-volatile memory, particularly in the unpowered state. To resolve this problem, a second key value, namely the password key may be generated. The password key should be known only to the security IC.

Figure 3:
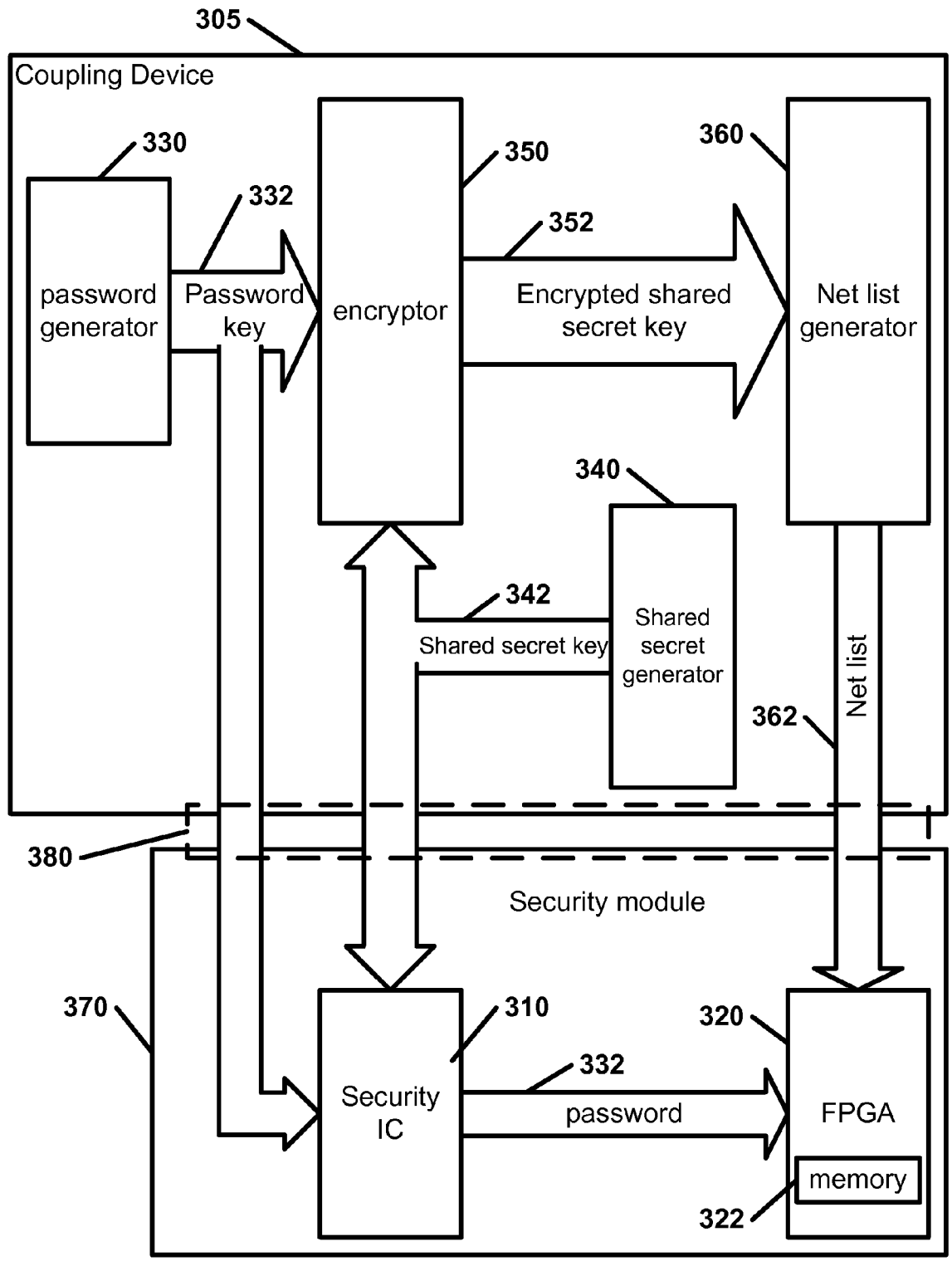
FIG. 3 is a block diagram of a coupling device and a security module as per an aspect of an embodiment of the claimed invention.

As shown in FIG. 3, shared secret key generation and password key generation occur inside a coupling device 305. In particular, a secret key generator 340 may be used to create the shared secret key 342. Likewise, a password key generator 330 may be used to create the password key 332. Both the shared secret key 342 and password key 332 may be directed to the encryptor 350. The encryptor 350 can then encrypt the shared secret key 342 using the password key 332, resulting in an encrypted shared secret key 352.

It should be noted that the claimed invention also permits the shared secret key 342 and password key 332 to be directed outside the coupling device 305 and into a security IC 310. The security IC may be found in a security module 370. The values from the shared secret key 342 and password key 332 may be used later by an FPGA 320 to decrypt the encrypted shared secret key 352.

A net list generator 360 can take the encrypted shared secret key 352 to create a net list 362. Only the encrypted value is incorporated into the FPGA's net list. The net list 362 may be used to program an FPGA 320. Programming may include instructions for the FPGA 320 to obtain the shared secret key 342 by decrypting the encrypted shared secret key 352. Instructions may also include storing the shared secret key in at least one volatile memory location 322.

Data may be transmitted between the coupling device 305 and security module 370 through an interface 380. In at least one embodiment, the interface 380 may allow for secure communication between the coupling device 305 and the security module 370.

Figure 4:
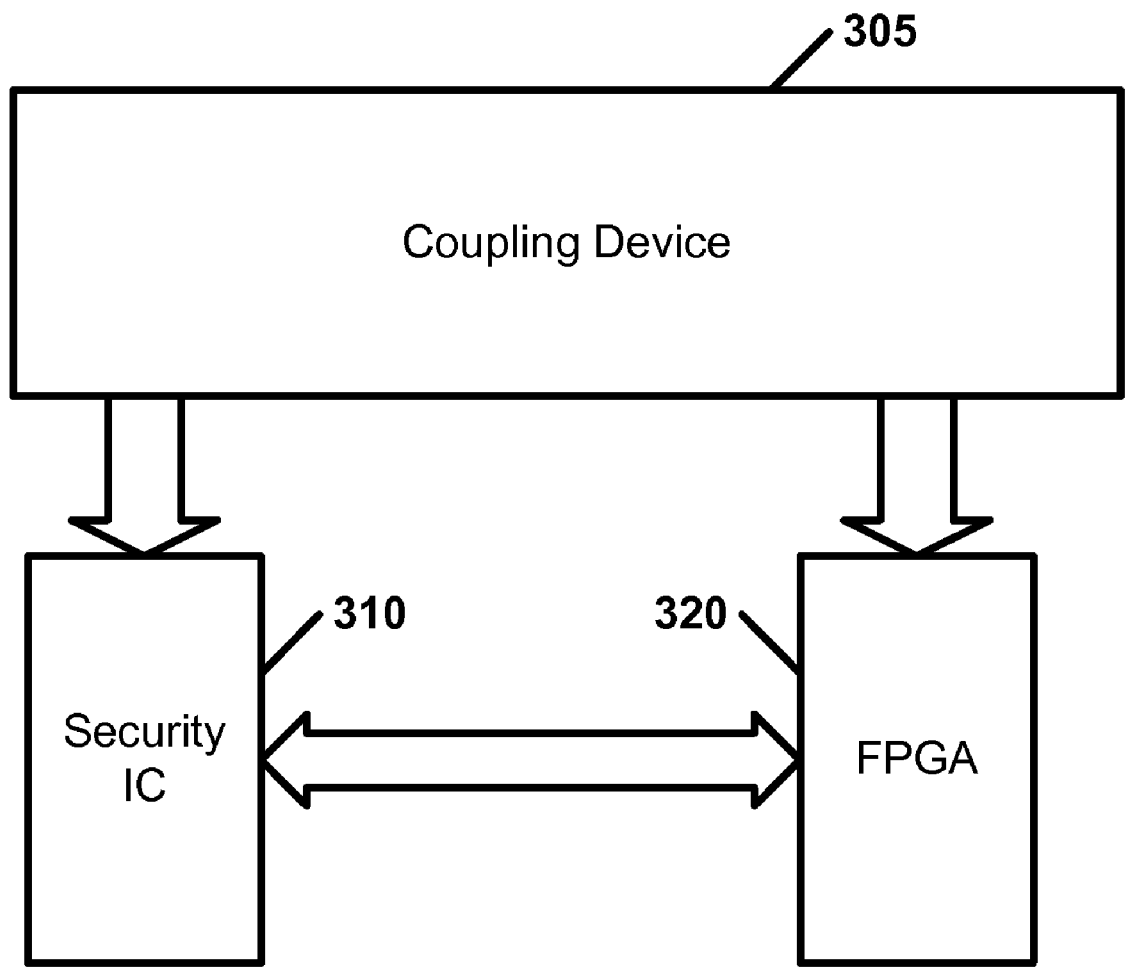
FIG. 4 is a block diagram showing a security IC and an FPGA connected to a coupling device as per an aspect of an embodiment of the claimed invention.

FIG. 4 reinforces the notion that the coupling device 305 can be connected to the security IC 310 and the FPGA 320. With this connection, the coupling device 305 can direct data to the security IC 310, the FPGA 320 or both.

Figure 5:
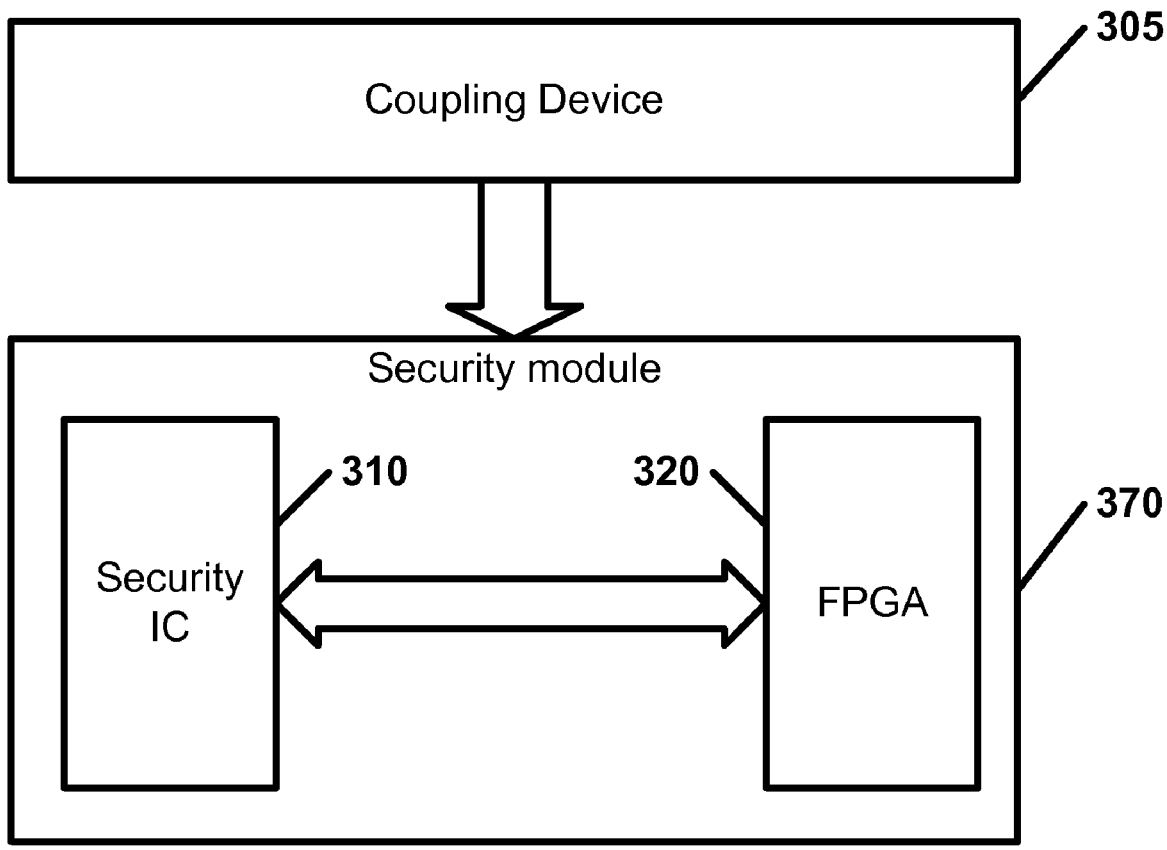
FIG. 5 is a block diagram of a security module connected to a coupling device as per an aspect of an embodiment of the claimed invention.

Alternatively, as illustrated in FIG. 5, the coupling device 305 can be connected to the security module 370. By having this connection, the coupling device 305 may direct data towards the security module 370. The security module 370 may in response appropriate directed data accordingly.

At session start-up, the security IC 310 transmits the password key 332 to the FPGA 320. To obtain the shared secret key 342, the FPGA 320 can decrypt the encrypted shared secret key 352. The shared secret key 342 can be stored in at least one volatile memory location 322. Also, the FPGA 320 can establish secure communications with the security IC 310.

In one embodiment, only the plain text keys in the FPGA are stored in volatile storage, and only in the full powered state. By placing plain text keys in the volatile memory location rather than a non-volatile memory location, FPGA zeroization should be more easily achieved. The FIPS 140 zeroization requirements can be addressed through the FPGA program logic.

In the powered state, the FPGA can respond to a zeroization command by simply overwriting its volatile storage or erasing at least one volatile memory location. In the unpowered state, the FPGA will store no plain text keys. The security IC itself, will implement the zeroization capability in both fully powered and standby states, as a facet of its support of FIPS 140. Therefore, both components will be rid of plain text keys as a result of zeroization, meeting the FIPS 140 requirement.

It is possible that a zeroization command may be prompted in response to any tamper detection. Examples of tamper detection include physical alteration, voltage surge, temperature changes, etc.

The process of incorporating the key into the FPGA's net list at manufacturing time can be very time consuming. Net list compilers provided by FPGA vendors can require many minutes to process a complex application. If a full net list recompilation is required to incorporate the unique encrypted shared secret for each unit, it may be impractical to manufacture more than a few units in this manner. Fortunately, FPGA net list architectures are available that allow a collection of pre-compiled modules to be combined (e.g., linked) with manageable overhead. These architectures allow a trivial module containing the encrypted shared secret value to be quickly compiled, and then incorporated into the full application net list.

In addition to the method taught above, a security module 370 is envisioned. The security module 370 may use any of the aforementioned methods. The module 370 that uses the aforementioned methods may contain an FPGA 320 securely coupled to a security IC 310.

Figure 6:
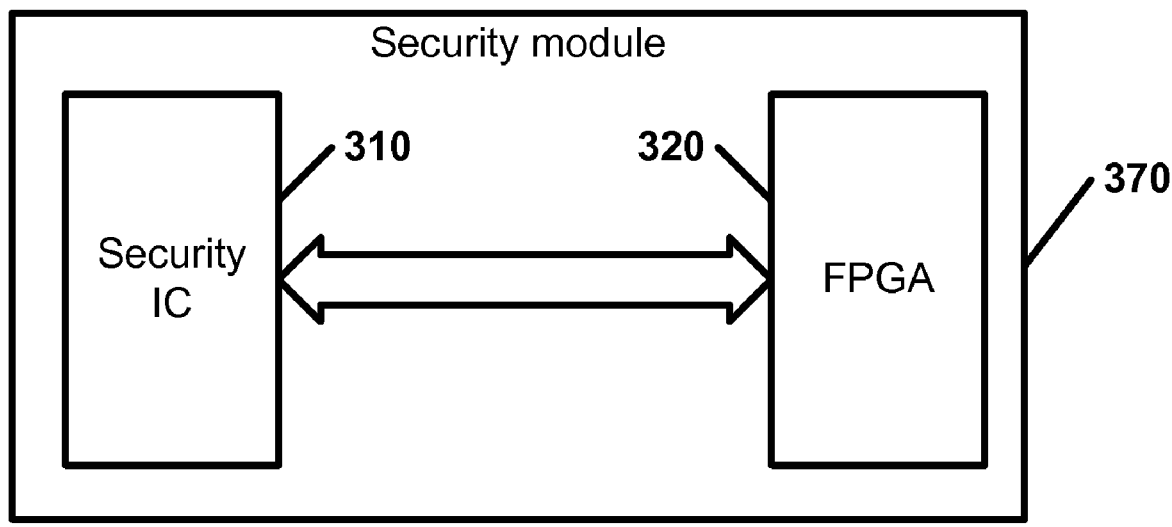
FIG. 6 is a block diagram of a stand alone security IC and FPGA configured to couple using an initialization procedure as per an aspect of an embodiment of the claimed invention.

FIG. 6 shows that a security module 370 can stand alone. As an independent component, it can house the security IC 310 and FPGA 320. It can also be configured to be coupled with the coupling device 305.

Figure 7:
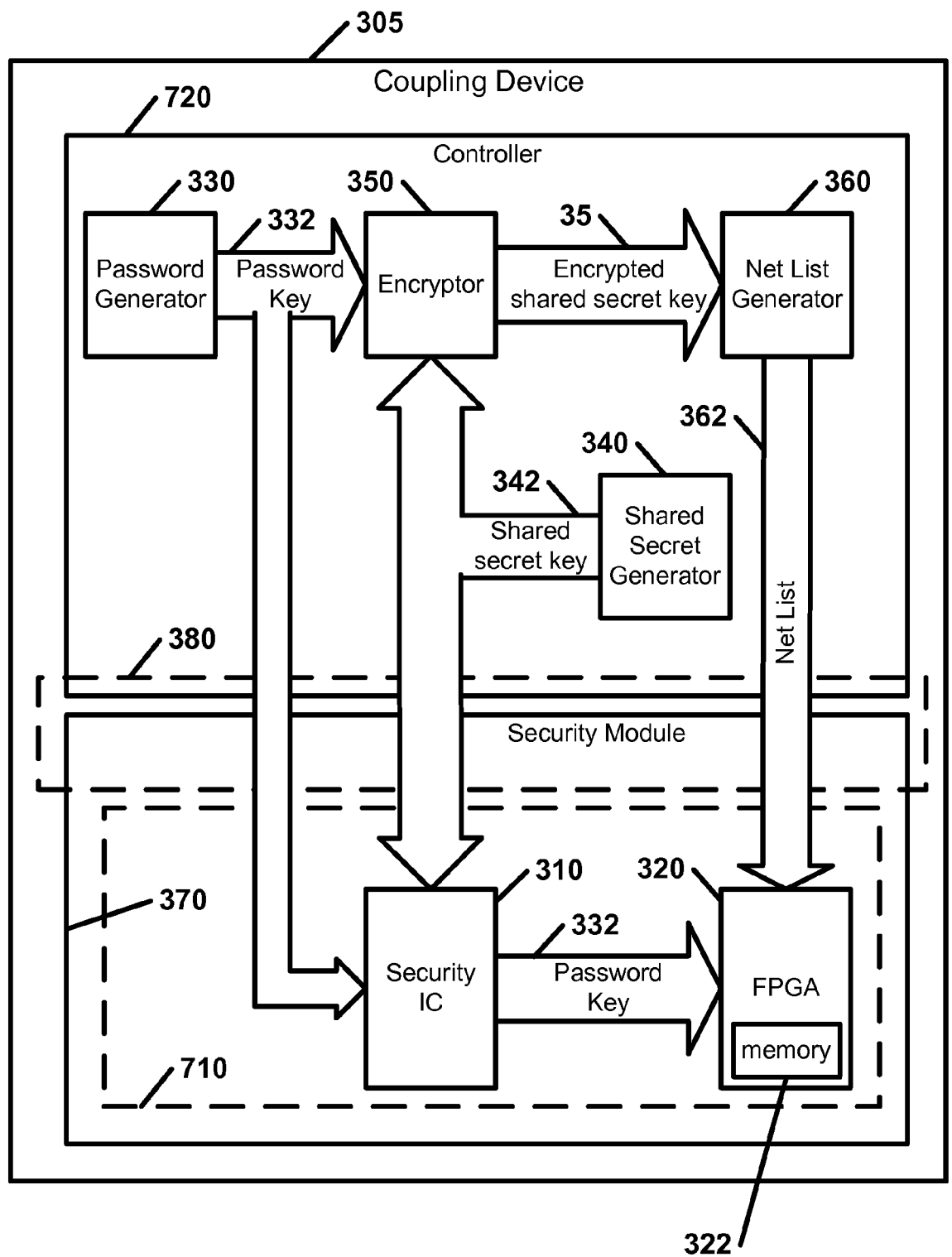
FIG. 7 shows a block diagram of a device showing an interface, controller, security IC and FPGA as per an aspect of an embodiment of the claimed invention.

Similarly, a device for securely coupling an FPGA to a security IC is also envisioned. As shown in FIG. 7, the device may comprise an interface 710, a controller 720, a security IC 310 and an FPGA 320. The interface 710 can be configured to communicate with the FPGA 320 and security IC 310. The controller 720 can be configured to perform a variety of steps. These steps include creating a shared secret key 342 at S100, creating a password key 332 at S102, generating an encrypted shared secret key 352 by encrypting the shared secret key 342 using the password key 332 at S110, incorporating the encrypted shared secret key 342 into an FPGA net list 362 at S120, and programming the FPGA 320 by using the FPGA net list 362 at S130. The controller 720 can perform these steps at an approximate time that the FPGA 320 transitions from a powered state to an unpowered state. Such time can range, for example, from instantaneously to almost an infinite amount of seconds. The time may also be interrupted with some intervening force (e.g., by a person, power surge, etc.) to decrease the transition time from a powered state to an unpowered state.

The device may also have a second interface 380 that allows the controller 720 to communicate with the security module 370.

By having performed these action, the security IC 310 may be able to transmit the password key 332 to the FPGA 320 at S140. In response, the FPGA 320 can obtain the shared secret key 342 by decrypting the encrypted shared secret key 352 at S150. The FPGA 320 can also store the shared secret key 342 in at least one volatile memory location 322 at S160.

As with the module, the device can also be configured to erase the volatile memory 322, shared secret key 342 and/or password key 332.

The foregoing descriptions of the embodiments of the disclosure have been presented for purposes of illustration and description. They are not intended to be exhaustive or be limiting to the precise forms disclosed, and obviously many modifications and variations are possible in light of the above teaching. The illustrated embodiments were chosen and described in order to best explain the principles of the disclosure and its practical application to thereby enable others skilled in the art to best utilize it in various embodiments and with various modifications as are suited to the particular use contemplated without departing from the spirit and scope of the disclosure. In fact, after reading the above description, it will be apparent to one skilled in the relevant art(s) how to implement the disclosure in alternative embodiments. Thus, the disclosure should not be limited by any of the above described example embodiments.

In addition, it should be understood that any figures, graphs, tables, examples, etc., which highlight the functionality and advantages of the disclosure, are presented for example purposes only. The architecture of the disclosed is sufficiently flexible and configurable, such that it may be utilized in ways other than that shown. For example, the steps listed in any flowchart may be reordered or only optionally used in some embodiments.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the disclosure in any way.

Furthermore, it is the applicants' intent that only claims that include the express language "means for" or "step for" be interpreted under 35 U.S.C. §112, paragraph 6. Claims that do not expressly include the phrase "means for" or "step for" are not to be interpreted under 35 U.S.C. §112, paragraph 6.

What is claimed is:

1. A method for securely coupling an FPGA to a security IC comprising:
    a. creating a shared secret key, said shared secret key configured for the negotiation of session keys;
    b. creating a password key;
    c. generating an encrypted shared secret key by encrypting said shared secret key with said password key;
    d. incorporating said encrypted shared secret key into an FPGA net list;
    e. programming said FPGA using said FPGA net list;
    f. transmitting said password key from said security IC to said FPGA; and
    g. said FPGA:
        i. obtaining said shared secret key by decrypting said encrypted shared secret key; and
        ii. storing said shared secret key in at least one volatile memory location.

2. The method according to claim 1, wherein said shared secret key is a plain text shared secret key.

3. The method according to claim 1, wherein steps 1.a through 1.f are performed using initialization code located on said security IC.

4. The method according to claim 1, wherein step 1.f is performed in response to said security IC and said FPGA transitioning from an unpowered state to a powered state.

5. The method according to claim 1, further including the steps of:
    a. erasing said password key on said security IC; and
    b. erasing said shared secret key on said security IC".

6. The method according to claim 1, further including the step of erasing said at least one volatile memory location on said FPGA.

7. The method according to claim 6, wherein said step in claim 6 is performed in response to a zeroization command.

8. The method according to claim 6, wherein step in claim 6 is performed in response to said FPGA transitioning from a powered state to an unpowered state.

9. A module containing an FPGA securely coupled to a security IC using a method comprising the steps of:
   a. creating a shared secret key, said shared secret key configured for the negotiation of session keys;
   b. creating a password key;
   c. generating an encrypted shared secret key by encrypting said shared secret key with said password key;
   d. incorporating said encrypted shared secret key into an FPGA net list;
   e. programming said FPGA using said FPGA net list;
   f. transmitting said password key from said security IC to said FPGA; and
   g. said FPGA:
      i. obtaining said shared secret key by decrypting said encrypted shared secret key; and
      ii. storing said shared secret key in at least one volatile memory location.

10. The module according to claim 9, wherein steps 9.a through 9.f are performed using initialization code located on said security IC.

11. The module according to claim 9, wherein step 9.f is performed in response to said security IC and said FPGA transitioning from an unpowered state to a powered state.

12. The module according to claim 9, wherein the method further includes the steps of:
   a. erasing said password key on said security IC; and
   b. erasing said shared secret key on said security IC.

13. The module according to claim 9, wherein the method further includes erasing said at least one volatile memory location on said FPGA.

14. The module according to claim 13, wherein erasing said at least one volatile memory location on said FPGA is performed in response to a zeroization command.

15. The module according to claim 14, wherein said zeroization command is generated in response to tamper detection.

16. The module according to claim 13, wherein erasing said at least one volatile memory location on said FPGA is performed in response to said FPGA transitioning from a powered state to an unpowered state.

17. A device for securely coupling an FPGA to a security IC comprising:
   a. an interface configured to communicate with said FPGA and said security IC; and
   b. a controller, said controller configured to perform the steps of:
      i. creating a shared secret key, said shared secret key configured for the negotiation of session keys;
      ii. creating a password key;
      iii. generating an encrypted shared secret key by encrypting said shared secret key with said password key;
      iv. incorporating said encrypted shared secret key into an FPGA net list; and
      v. programming the FPGA using said FPGA net list; thereby enabling:
   c. said security IC to transmit said password key to said FPGA; and
   d. said FPGA:
      i. to obtain said shared secret key by decrypting said encrypted shared secret key; and
      ii. to store said shared secret key in at least one volatile memory location.

18. The method according to claim 17, wherein step 17.b is performed at the approximate time that said FPGA transitions from a powered state to an unpowered state.

* * * * *